INVENTOR.
Hermon Hosmer Scott
BY David Rines
ATTORNEY

Aug. 12, 1952 H. H. SCOTT 2,606,973

ELECTRIC FILTER

Filed Feb. 9, 1946 6 Sheets-Sheet 2

INVENTOR.
Hermon Hosmer Scott
BY David Rines
ATTORNEY

INVENTOR.
Hermon Hosmer Scott
BY David Rines
ATTORNEY

INVENTOR.
Hermon Hosmer Scott
BY David Rines
ATTORNEY

Aug. 12, 1952 H. H. SCOTT 2,606,973

ELECTRIC FILTER

Filed Feb. 9, 1946 6 Sheets-Sheet 5

INVENTOR.
Hermon Hosmer Scott
BY David Rines
ATTORNEY

Aug. 12, 1952 H. H. SCOTT 2,606,973

ELECTRIC FILTER

Filed Feb. 9, 1946 6 Sheets-Sheet 6

INVENTOR.
Hermon Hosmer Scott
BY David Rines
ATTORNEY

Patented Aug. 12, 1952

2,606,973

UNITED STATES PATENT OFFICE 2,606,973

ELECTRIC FILTER

Hermon H. Scott, Lincoln, Mass., assignor, by mesne assignments, to Myron T. Smith, Concord, Mass., trustee Application February 9, 1946, Serial No. 646,620

21 Claims. (Cl. 178—44)

Figure 1:
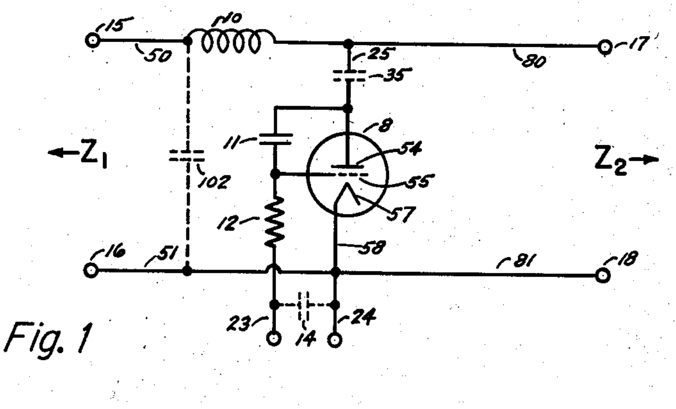

The present invention relates to electric filters, and more particularly to variable filters having sharp cut-off, with high attenuation beyond cut-off and capable of being varied by a control voltage which may be derived from the applied signal.

Wave filters and networks of various types are widely used to provide transmission characteristics and attenuation varying with frequency. Some of these employ resistance and reactance, others reactance only.

Where minimum attenuation is desired within a pass-band, and maximum attenuation beyond the pass-band, reactance-type wave filters are generally used, embodying series and shunt elements that are mainly reactive. Such filters are of many types, as simple $\pi$, T, or L-section, and more complicated lattice and balanced-H types. Variation of the filters is effected by means of variable reactances, such, for instance, as variable inductors or variable condensers.

There are cases, however, when operation must be secured at a high rate of speed, or in accordance with an electric signal or voltage. In automatic systems for suppressing spurious noise, for example, and in other applications, it is necessary to provide a high degree of discrimination, and to allow of great rapidity of control. In such cases, the conventional means for mechanically varying a reactance are impracticable. In the endeavor to solve this problem, reactance tubes and variable-resistance tubes, in a number of cases, have been applied to simple R–C and other circuits to effect high-speed control, but they have not been very effective.

It is accordingly an object of the present invention to provide a new and improved filter that may very effectively be varied in accordance with a control voltage or current, and that shall have an exceedingly sharp cut-off, with a very high degree of attenuation beyond cut-off.

Another object is to provide a new and improved filter having a predetermined amount of resonance in the region of cut-off, thus to increase the response in that region.

A further object of the invention is to provide a new and improved filter that may be varied very rapidly, but without introducing spurious components of the control voltage into the output circuit of the filter.

A further object still is to provide a new and improved m-derived filter having a variable cut-off point controllable in accordance with a control voltage or current, and a point of very high or substantially infinite attenuation, limited only by the loss of the circuit.

It is a further object of the invention to provide a new and improved variable m-derived filter of the above-described character in which the point of very high or substantially infinite attenuation shall vary in predetermined relationship with the cut-off frequency.

Another object of the invention is to provide a new and improved variable filter having two points of very high or substantfially infinite attenuation, one of which shall vary in a predetermined manner with respect to the cut-off frequency.

A still further object is to provide a new and improved m-derived filter in which the point of very high or substantially infinite attenuation shall be variable in accordance with a control voltage or current.

A still further object is to provide a new and improved filter which shall be variable in accordance with the signal being transmitted.

Other and further objects will be explained hereinafter, and will be more particularly pointed out in the appended claims.

Figure 2:
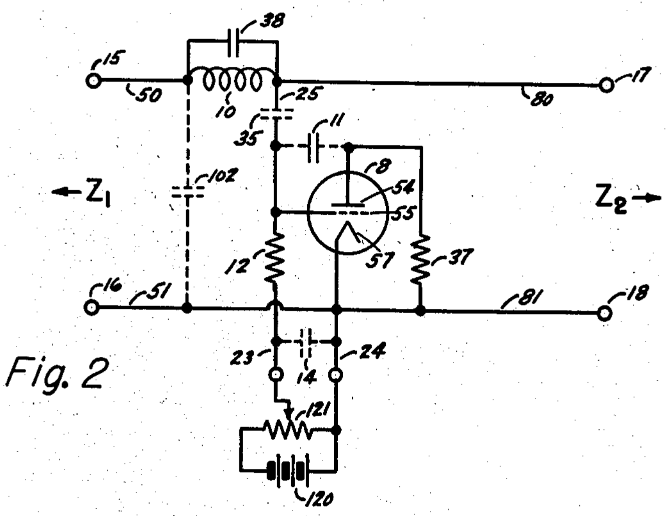
Figure 3:
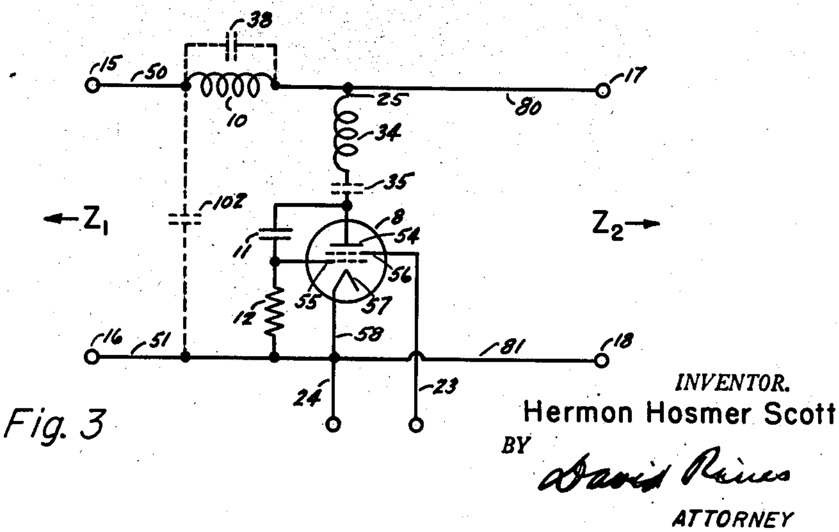
Figure 4:
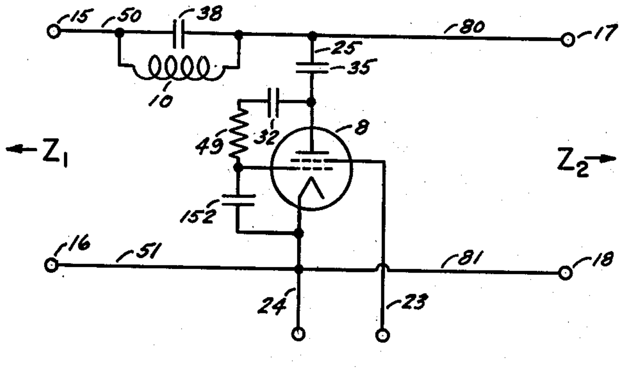
Figure 5:
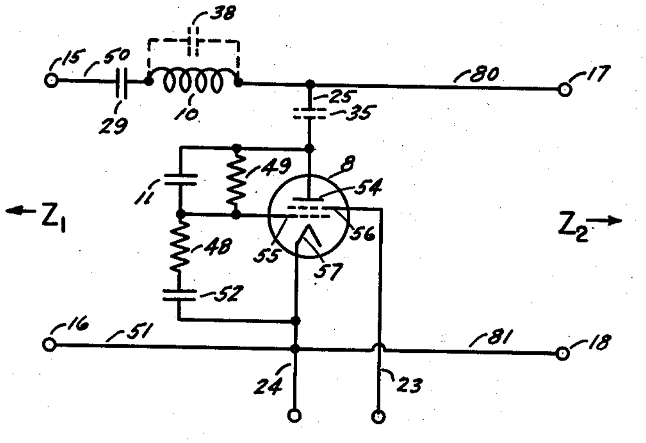
Figure 13:
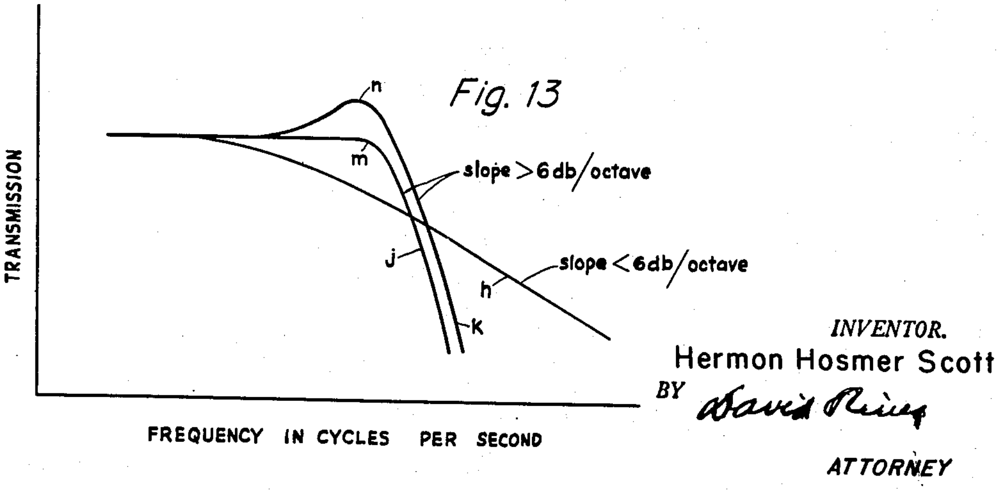
Figure 6:
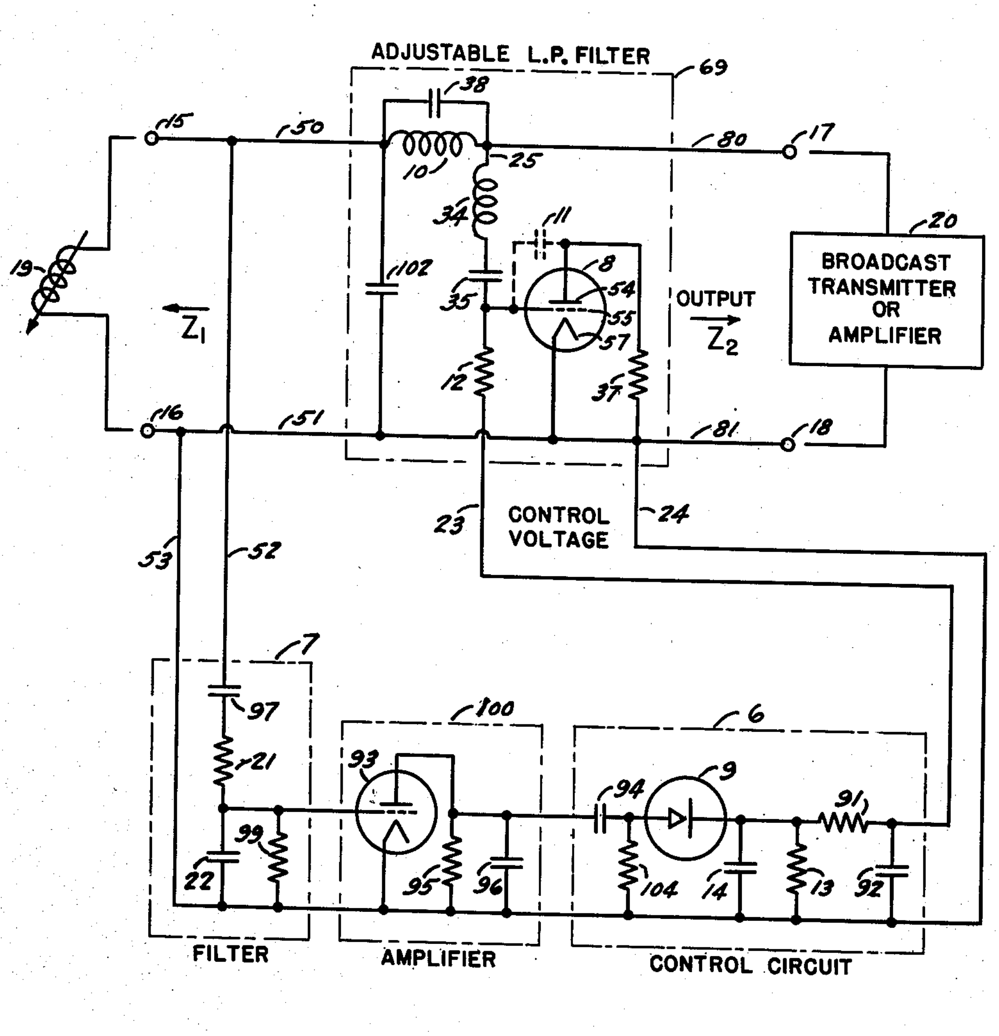

The invention will now be more fully explained in connection with the accompanying drawings, in which Fig. 1 is a diagrammatic view of a variable low-pass wave-filter utilizing a reactance tube, and so connected that the filter shall present, in effect, a high-pass characteristic to the control voltage, thus preventing audio-frequency components of the control voltage from appearing in the output circuit; Fig. 2 is a similar view showing an improved circuit in which one of the arms is resonated to provide an m-derived filter having a high degree of attenuation above cut-off; Fig. 3 is a similar view of a double-m-derived filter having a variable resonant arm and a very sharp cut-off characteristic; Fig. 4 is a similar view of an alternative type of double-m-derived filter; Fig. 5 is a similar view of a variable band-pass filter comprising an alternative type of reactance tube that may be substituted in the systems of any of Figs. 1 to 4; Fig. 6 is a diagrammatic view of circuits and apparatus showing a further modification of the system shown in Fig. 3, embodied in a noise-suppression system; and Figs. 7 to 13 present explanatory diagrams of typical frequency-response curves for the various filters, with the abscissae plotted logarithmically, in terms of cycles-per-second frequency, and with the ordinates plotted arithmetically, in terms of decibels-units response.

The noise-suppressor system shown in Fig. 6 will serve as an illustration of a use to which the wave filter of the present invention may be put. When an input signal, as from a phonograph pick-up, a radio-receiver, or another source 19, of impedance $Z_1$, is applied to input terminals 15 and 16, it is transmitted, by input-lead conductors 50 and 51, through the filter 69 of the present invention, and by way of output-lead conductors 80 and 81, to the output terminals 17 and 18. These may be connected to any output load 20, of impedance $Z_2$, such as a loudspeaker, an amplifier, or a radio-transmitter. The pick-up 19 and the load 20 are shown symbolically as typical source and load and may be provided with amplification and the like where necessary.

The filter 69 may, for example, be designed to pass normally only a restricted range of frequencies at low-volume levels. This may be expanded to the full range that it is desirable to transmit at high-volume levels.

The wave filter 69 may assume a number of different forms in accordance with the present invention. The form shown in Fig. 1, for example, comprises essentially a low-pass half-section constant-k type comprising a series arm, shown comprising an inductance 10, connected in the input lead 50, and a shunt arm comprising a variable simulated shunt capacitance connected across the output leads 80 and 81.

The variable shunt capacitance comprises a capacitive reactance tube 8. The reason why the reactance tube 8 functions as a capacitance will be explained presently. A condenser 35 may be connected in series with a lead conductor 25, in series with the reactance tube 8. It is shown dotted in some of the figures, to indicate that it may be omitted.

A condenser 11 may be connected between the anode or plate 54 and the control-grid electrode 55 of the tube 8. The condenser 11 is shown in dotted lines in Fig. 6 to indicate that it may be omitted. The condenser 11 may be eliminated in all cases, and more particularly in all types of feed-back circuit where the normal internal grid-plate capacitance of the tube is large enough to provide sufficient feed-back. The anode 54 and the condenser 11 are shown in Figs. 1, 3 and 5 connected in parallel to the output lead 80 by the lead conductor 25, and the cathode 57 of the tube 8 is connected to the input lead 51 and the output lead 81 by a conductor 58. A parallel-connected condenser 102 may form, with the other circuit elements, a complete $\pi$-section filter and thus increase the attenuation at high frequencies. The condenser 102 may be variable or it may be replaced by a second reactance tube, if desired. The condenser 102 is shown dotted in Figs. 1 to 3, to indicate that it may be omitted, as in Figs. 4 and 5.

The attenuation or suppression may be under the control of a control circuit 6, as shown in Fig. 6. The input side of the control circuit 6 is subjected to the action of the input signal from the signal source 19 through the medium of lead conductors 52 and 53 respectively connected to the input leads 50 and 51. The control circuit 6, the associated amplifier 100 and the control filter 7 as shown in Fig. 6 may be used with any of the other filter circuits shown in the other figures as, for instance, Figs. 1, 2, 3, 4 and 5.

The output of the control circuit 6 is connected, by a conductor 24, to the cathode 57 and, by a conductor 23, through the resistor 12, to the control grid 55. The resistor 12 thus transmits bias voltage from the control circuit 6 to the grid 55. The grid bias thus developed in the system of the control circuit 6 is therefore transmitted by the leads 23 and 24 to the adjustable filter to impress an adjustable control voltage from the output of the control circuit 6 upon the grid 55. The reactance tube 8 is thus controlled to vary the cut-off of the filter. The condenser 14 of Figs. 1 and 2 and the condensers 14 and 92 of Fig. 6 filter the control voltage by attenuating high frequency components. These condensers may be used in any of the circuits shown.

The capacitance 11 and the resistance 12 are so connected as to provide a feed-back network between the plate or output and the grid or input circuits of the reactance tube 8. This feed-back causes the plate current of the reactance tube 8 to lead the applied alternating plate voltage by approximately 90° at high frequencies. The plate or output circuit of the tube 8, with its associated circuits, of the tube 8, with its associated circuits, therefore, as before stated, functions as a capacitance. The magnitude of this simulated capacitance is a function of the transconductance of the tube 8, and this, in turn, is a function of the electrode voltages.

The grid circuit may also be made to function as a capacitance as in Figs. 2 and 6, and similar circuits but with opposite sign of phase shift may be made to simulate an inductance as in Fig. 4. The simulated reactance may be in the grid circuit, the plate circuit, or at some point in between in the feed-back circuit.

Figs. 1 to 5 show other circuits which may be substituted for the filter 69 of Fig. 6; in other words all of these variable filter circuits may be used interchangeably with control circuits as shown in Fig. 6. The characteristics of these various filters will be further described.

The series inductance 10 and the simulated variable capacitance of the reactance tube 8 shown in Fig. 1 form, in effect, a low-pass constant-k filter yielding substantially no attenuation within the low-frequency band, and a high degree of attenuation outside of that band, in the high-frequency range. As with filters utilizing conventional inductors and capacitors, this attenuation is effected by introducing out-of-phase components as a result of the phase shifts in the circuit elements. These out-of-phase components tend to cancel components of the applied signal. This will tend to prevent the high-frequency components of the signal voltage at the input terminals 15 and 16 from appearing at the output terminals 17 and 18. This is distinguished from prior-art circuits which have only a gradually-changing loss characteristic and that must, by their very nature, cause serious attenuation within a desired band in order to produce noticeable noise suppression above that band.

Figure 7:
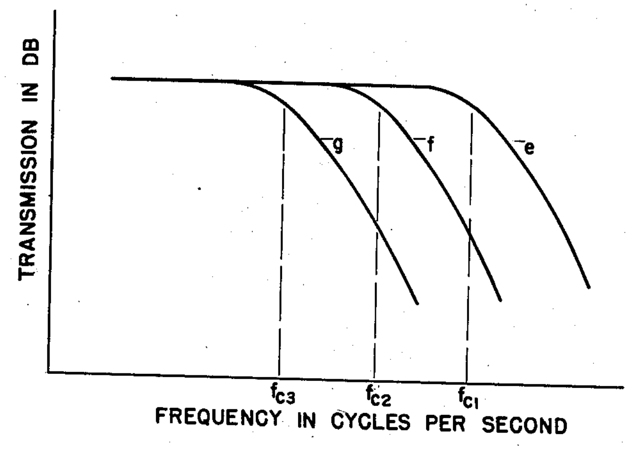

Characteristic curves of a simple constant-k filter of the type shown in Fig. 1 are presented at *e*, *f*, and *g* of Fig. 7, representing the variation in transmission as the transconductance of the tube 8 is varied, as by varying the grid bias applied to the conductors 23 and 24, thus varying the capacitance of the reactance tube 8. The corresponding cut-off frequencies are shown at $f_{c1}$, $f_{c2}$ and $f_{c3}$ respectively, showing how the cut-off frequency of this type of filter varies as the reactance tube 8 is varied.

The conventional R–C or L–R tone control of a radio receiver may be rendered automatically controllable in response to volume level by means of reactance or variable-resistance tubes or other devices. The rate of increase of attenuation obtained with a circuit of this character, however, approaches six decibels per octave as a maximum, and the cut-off is very gradual, as represented by the curve *h* of Fig. 13. Because of this gradually-changing-loss characteristic applied to the high-frequency response, such operation is often unsatisfactory. A great improvement may, however, be obtained with a sharp cut-off characteristic, as represented by the curves *j* and *k* of Fig. 13. The curve *j* demonstrates that the relatively sharp cut-off *m* can be obtained in a correctly designed reactance-type wave filter. The curve *k* represents a similar cut-off, but with a resonant peak *n*, indicating an increase in amplitude for a particular range of frequencies. Both curves *j* and *k* exhibit, with respect to the curve *h*, the sharp cut-off characteristics *m* and *n*, indicative of a reactance-type filter that operates through the medium of resonance effects. These effects, if the circuit is less than critically damped, tend to increase the amplitude or the duration of transient sounds in the frequency range involved, in the neighborhood of the cut-off frequency, thus increasing the stimulus to the ear and, in effect, intensifying, such transient sounds. The term "intensifying" may be employed, therefore, to designate increasing the amplitude, or lengthening the duration of, the signals, as through resonance, thus enhancing the effect of the signals in the particular frequency range.

The curve *j* is characteristic of a reactance-type wave filter matched to theoretically correct load impedances, or otherwise connected to impedances having a certain amount of resistance or dissipation. The curve *k* is characteristic of a similar filter operating at impedances deviating from conventional matched values. The curves *j* and *k* also provide less apparent decrease in the high-frequency response, because of the sharp cut-off or the resonance.

Resonance may be obtained, for instance, by operating a filter, like the filter of Figs. 1 to 6, from a relatively low impedance $Z_1$. The resonance is further increased by operating the filter into a high impedance $Z_2$, as across the leads 80 and 81.

The present invention, through the use of a filter having at least two reactive filter elements, comprising a resonant circuit in one arm, or two or more arms of which both may have a reactive impedance, provides a sharp cut-off sufficiently steep so that the attenuation of the high-frequency components of the signals shall increase, above the high-frequency limit, at a rate greater than about six decibels per octave. The rate of increase of attenuation for both curves *j* and *k*, for example, is greater than six decibels per octave. At least one of the reactances or one of the arms is variable to vary the cut-off characteristics.

By "reactive filter element" is meant an actual circuit impedance, which may actually comprise several circuit components in series or parallel to obtain the desired impedance. A reactance tube, with its associated feed-back or other control circuits, is considered as a single filter element.

The variable low-pass filter shown in Fig. 2, as a modification of the low-pass filter shown in Fig. 1, has improved characteristics. The series arm of the filter containing the inductor 10 is tuned by means of a parallel-connected capacitor 38 to provide a parallel-resonant circuit. This provides an m-derived filter with a corresponding fixed point of high or substantially infinite attenuation above the cut-off of the normal transmission range, where the capacitor 38 resonates with the inductor 10, as is represented at *a* in Fig. 8. The attenuation of the filter above cut-off becomes thereby improved. By eliminating the tuning condenser 38 in the series arm, the fixed point of high attenuation may be eliminated, if unnecessary for the particular application, as in the system of Fig. 1.

The reactance tube of Figs. 2 and 6 is shown in an alternative version, with the lead 25 connected to the grid or control electrode 55. The results are similar, choice between the two connections depending upon the desired operating characteristics, the signal level, and other factors. The operation of the grid-connected version is sometimes referred to as the "Miller effect," in which the input impedance of the tube varies as a function of the applied voltages. In this case, the capacitance 11 may be considered as augmenting the normal grid-plate capacitance of the tube, thus to enhance the effect. The capacitance 11 may often, therefore, be omitted. A resistor 37 may be connected in the output circuit of the reactance tube 8.

For variety, Fig. 2 shows an alternative means of control of the filter, comprising a voltage source 120 and a potentiometer 121.

The filters of Figs. 3 and 6 are similar to the filter of Fig. 2, but they incorporate a still more important variation, in that the shunt arm thereof embodies also a second inductor 34, connected in series with the conductor 25, and therefore in series with the variable reactance of the reactance tube 8. The shunt arm may or may not embody also a capacitor 35. The inductor 34 forms a series-resonant circuit with the simulated capacitance of the reactance tube 8. This provides a point of high or substantially infinite attenuation which may be just above the cut-off frequency of the normal transmission range, represented in Fig. 9 as *b*, *c* or *d*, that varies as a function of the capacitance of the reactance tube 8 and, consequently, with the cut-off frequency. This variable point may vary in a predetermined relationship with respect to the cut-off frequency. The second inductor 34 may or may not be inductively coupled to the first inductor 10, as in conventional filter circuits. As already explained in connection with the description of Fig. 2 the condenser 38 may be omitted when the fixed point of high attenuation is not needed. It is therefore shown by dotted lines in Figs. 3 and 5. In some instances the inductance 10 may also be replaced by a resistance.

The condenser 35 may be used for blocking or tuning purposes only, or it may be utilized also to improve the control characteristics of the filter. If used, it will, in effect, form a high-pass filter with the inductance 10 or other suitable series arm. This filter will shunt to the low-voltage side of the system, through the input circuit of the filter, any spurious low-audio-frequency components of the control voltage that may reach the control grid 55 from the control circuit 6, and that might otherwise have appeared at the output terminals 17 and 18.

The action of this high-pass filter is particularly effective when the input circuit is connected to a relatively low impedance; and this, as already explained, will also improve the cut-off characteristics. Rapid control of the circuit may thus be attained without "thumps" or other audio components of the control voltage applied to the grid 55 that might appear in the output circuit.

Figure 8:
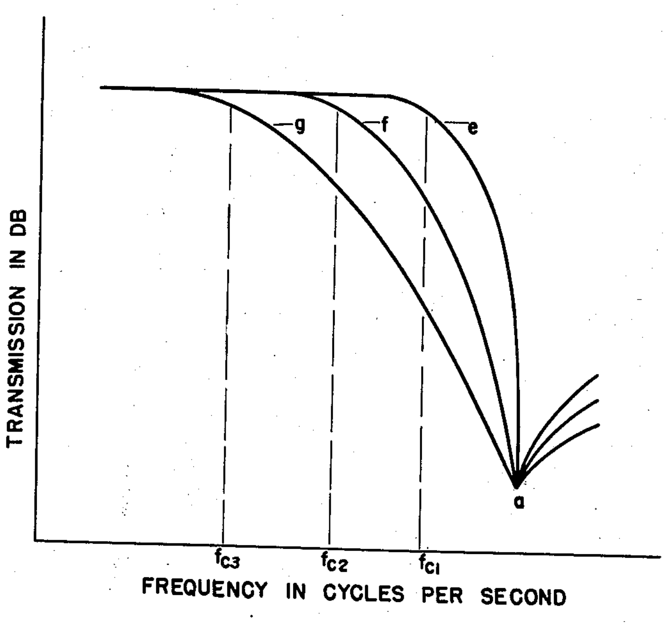

The corresponding characteristic curves *e*, *f* and *g*, of the type of filter shown in Fig. 2, as the control voltage is varied, are shown in Fig. 8.

They represent, respectively, the conditions for high, medium and low transconductance of the tube. The point of high attenuation, as before stated, is shown at *a*.

Figure 9:
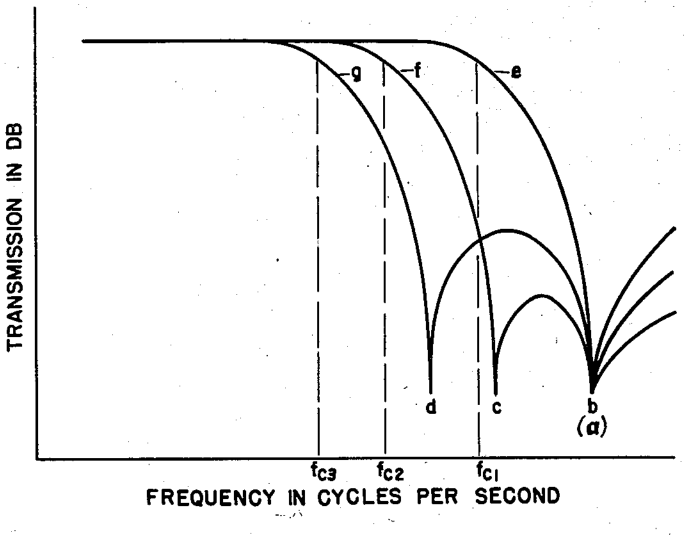

The characteristic curves presented in Fig. 9 represent typical operating characteristics for the filters of Figs. 3 and 6. The curves *e* and *g* represent typical cut-off characteristics for maximum and minimum attenuation, determined by the amplitude of the grid bias, or of the input signal or a predetermined range of the input signal when controlled as in Fig. 6, and the curve *f* illustrates an intermediate cut-off characteristic. The cut-off curves *e*, *f* and *g* may, of course, have other shapes in the cut-off region, such as are represented by *m* and *n* in Fig. 13. For each variable cut-off frequency of the filter of Figs. 3 and 6, there is a corresponding variable point of very high or substantially infinite attenuation, represented at *b*, *c* and *d*, respectively, caused by the series resonance of the inductance 34 and the capacitance of the reactance tube 8, and limited only by the loss of the circuit. The point of substantially infinite attenuation varies in predetermined relationship with the cut-off frequency. There may also be a fixed point of high or substantially infinite attenuation, as at *a* in Fig. 8. This type of circuit, therefore, functions as a double-m-derived filter having an exceedingly sharp variable cut-off characteristic with a very high degree of attenuation above cut-off, and it may have a predetermined amount of resonance in the region of cut-off, thus to increase the response in that region. This type of filter may be varied very rapidly, in accordance with the control voltage or current, without introducing spurious components of the control voltage into the output circuit of the filter. In this particular instance, the point of high attenuation, controlled by the inductance 10 and the capacitance 38, also coincides with the point *b*, but this is not necessarily the case.

For the sake of variety, the reactance tube 8 of the filter of Fig. 3 is shown similar to that of Fig. 1, but with a separate control electrode 56 for the control voltage. The characteristics of the filter of Fig. 6 are similar to those of the filter of Fig. 3 but each employs different reactance-tube connections.

Figure 10:
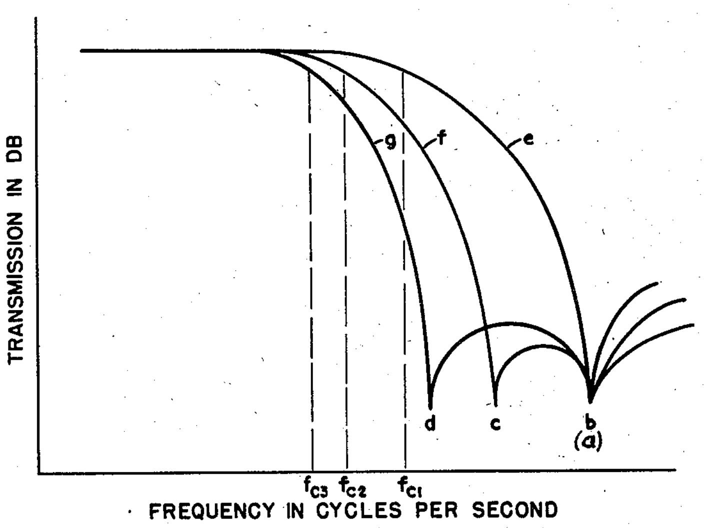

In the filter of Fig. 4, the reactance tube 8 is inductive, the phase shift between the plate and grid voltage being opposite in sign to that where the reactance of the tube 8 is capacitive. The simulated inductance of the reactance tube 8 may resonate with the capacitance 35 to provide a point of very high attenuation, varying with the mutual conductance of the tube 8. The type of characteristic curve obtained with a low-pass filter of this type is shown in Fig. 10. Compared to the characteristic curves of Figs. 9 and 11, the cut-off frequency does not vary so much, but the variable point of high attenuation does vary, thus changing the general shape of the cut-off curve. This circuit allows elimination of one inductance 34, which is important in some applications. For the curve *e*, the resonant frequencies for the shunt and series arms coincide. For the curves *f* and *g*, the resonant frequency of the shunt arm is lower than that of the series arm.

While the circuits described so far are low-pass, the same principles may be applied to the construction of high-pass, band-pass, and band-elimination filters.

Figure 11:
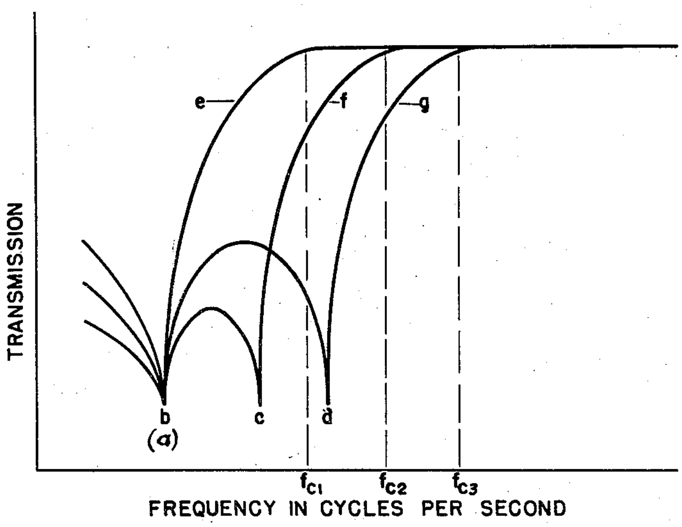
Figure 12:
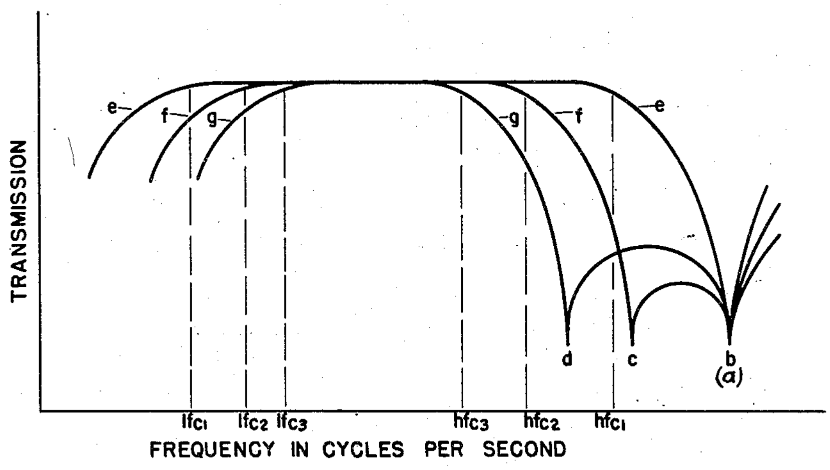

If the resonant frequency of the shunt arm is above that of the series arm, the filter of Fig. 4 may become the high-pass counterpart of the low-pass filter of Fig. 3, providing transmission characteristics as shown in Fig. 11. Any of the other low-pass circuits may similarly be changed to equivalent high-pass circuits by changing the feed-back circuit of the reactance tube to provide a phase lag rather than a phase lead between the current and the applied voltage, and by changing the sign of other circuit reactances, capacitive to reactive, and vice versa. The filter of Fig. 1 may therefore become high-pass by changing the inductance 10 to a capacitance and substituting the reactance tube of Fig. 4, with its associated feed-back circuit, or an equivalent feed-back circuit. Similar conversions may be made in the other circuits, as will be evident to persons skilled in the art.

High and low-pass units may similarly be used together, or combined into a single filter section to provide band-pass or band-elimination characteristics, as shown in Fig. 5. The feed-back circuit associated with the vacuum tube 8 is shown such that the plate current lags the plate voltage at low frequencies and leads the plate voltage at high frequencies. The filter configuration shown in Fig. 5 produces results as shown by the characteristic curves of Fig. 12. This type of filter, controlling both high and low frequencies, finds many uses.

In Figs. 2 to 6, the series arm of the filter is shown as a resonant circuit. The corresponding series arm of the filter of Fig. 1 may also be resonant. In all these Figs. 1 to 6, the shunt arm is shown as including a reactance tube. The shunt arms of the filters of Figs. 3 and 6 are also shown comprising a resonant circuit. As already explained, the filter of Fig. 4 is similar to that of Fig. 3, except that it is high-pass, instead of low-pass.

The shunt arm of this filter may or may not be resonant, depending upon the value of the condenser 35. The shunt arm of Fig. 5 may simulate a resonant circuit, either because of the value of the capacitance of the condenser 35, or because of the feedback circuit between the plate 54 and the grid 55 comprising the condensers 11 and 52 and the resistors 48 and 49, which may provide feedback of one sign at low frequencies and of the opposite sign at high frequencies.

In Figs. 7 to 12, inclusive, the cut-off characteristics do not show any resonant rise, indicating that the filters are operated into impedances somewhere near their theoretically matched values. This shape of cut-off is typified by the curve *j* of Fig. 13. As is well known, with wave filters, the cut-off characteristic may be shaped as shown at *k* in Fig. 13, with a resonant rise just below cut-off, by terminating the filters in other impedances. For the filters shown in Figs. 1 to 6, inclusive, this is generally attained by reducing the terminating impedance $Z_1$ below its normal value, or increasing the impedance $Z_2$ above its normal value, or by a combination of these two procedures. Similar results may be attained with low-pass, band-pass, and band-elimination sections, providing peaks above, with, or without the cut-off frequencies, respectively. This feature is frequently of importance in connection with systems for reproducing sound by restoring, to a certain degree, the aural balance which would otherwise be lost by attenuation of frequencies beyond the cut-off point.

The filters of the present invention may be controlled with unusual rapidity, particularly when the terminal impedance $Z_1$ is low in value.

In the filter of Fig. 1, for instance, the capacitor 35 and the inductor 10 comprise a high-pass filter between the terminals 23 and 24 and the output terminals 17 and 18 if the input impedance $Z_1$ is of low value. Any low-frequency spurious signals resulting from the control action will then be attenuated before reaching the output circuit. This is of particular importance in systems where the variable filter must be operated rapidly for controlling noise level.

Each of these fixed and variable cut-off points assures an extremely sharp cut-off. This filter, therefore, provides unusually sharp cut-off and unusually high attenuation above cut-off, allowing of rapid control.

An important application of this type of filter is in suppressing noise as obtained in the reproduction of phonograph records. Under these conditions, sharpness of cut-off is very important and the point *c* or *d* of high attenuation may vary from a low value, such as 2,500 cycles, to a high value, such as 8,000 cycles or higher, depending upon the characteristics and the limitations of other parts of the system.

The adjustments may be such that the control circuit 6 automatically adjusts the cut-off frequencies of the filter so as to attenuate all frequency components of the input signal above a predetermined value, such as 2,500 cycles, at low-volume or low-intensity levels of the signals, or predetermined ranges of the signal. The spurious noises accompanying the high-frequency components are thus eliminated at low-volume levels with a minimum effect upon the tone quality. The system thus adjusts itself automatically to the signal to be transmitted.

The fixed point *a* of high attenuation characteristic, for instance, of Figs. 2, 3, and 6 should generally be placed above the normal operating range. For reproducing ordinary shellac records, which contain frequencies up to approximately 8,000 cycles, 9,000 cycles is a good value for this purpose. If the system is to be used also for the reception of amplitude-modulated radio broadcasts, 10,000 cycles, which is the difference between adjacent channels, is a desirable value, as the 10,000-cycle attenuation will reduce also the heterodyne whistles. For program sources involving higher frequencies, of course, this fixed attenuation point *a* may be set at a still higher frequency.

The said points of high attenuation are points at each of which the attenuation reaches a maximum with respect to adjacent higher and lower frequencies, and are determined by series or shunt resonance in one of the filter arms. If the resonant circuits causing the points of high attenuation had no loss whatever, or no resistive components, the attenuation at these points would be infinite.

Any impedance connected to the input leads 50 and 51, such as the pick-up 19, or any interposed amplifier or network, may have an impedance sufficiently low so as to provide a certain amount of resonant rise in the filter characteristic below cut-off, or less than critical damping for the resonant circuits in the filter. This tends to provide a certain amount of compensation to the ear for the cut-off of the higher frequencies under conditions where frequencies that might be audible may be attenuated, as may occur upon the application of a sudden loud transient.

The resonant effect is improved by connecting a high impedance across the leads 80 and 81. This condition of resonance may exist at high-signal levels only momentarily, while the cut-off characteristic is shifting to a higher frequency. The resonant condition is therefore not apparent to the ear as such.

The filters may be operated in either direction; that is, with the terminals 15 and 16 and the output terminals 17 and 18 interchanged. In either case, the terminating impedance $Z_1$ of the filter will be on the mid-series side, and the terminating impedance $Z_2$ on the mid-shunt side, of the filter. The various filter half-sections may be connected together to form T or $\pi$ sections. Changing the direction of operation of the filter circuits may have the effect of obtaining the control voltage from the output circuit instead of the input circuit.

A filter network 7 may be inserted in the lead conductors 52 and 53, in the input circuit of the control circuit 6, to vary the response of the control circuit 6 with frequency. This may be in accordance with the characteristics of the human ear, or for any desired range of frequencies. The control circuit 6 may pass frequencies outside of the controlled range only, thus providing improved discrimination against noise. This, or other control circuits may be used with any of the filters shown.

The input-filter network 7 embodied in the system of Fig. 6 is shown comprising a condenser 97 and a resistor 21 connected in series in the control-input conductor 52, followed by a capacitor 22 and a resistor 99 connected in parallel across the circuit, to reduce the sensitivity to very high and low frequencies. The filter 7 is connected in the input circuit of the amplifier 100 for increasing the magnitude of the control voltage and also to provide optimum control characteristics and additional filtering. The amplifier 100 may comprise a vacuum tube 93 the output circuit of which is provided with a resistor 95. A condenser 96 in parallel with the resistor 95 further reduces the high-frequency response. A series condenser 94 in the input circuit of the control circuit 6, serving as a blocking condenser between the amplifier 100 and the control circuit 6, may function also to reduce the sensitivity at low frequencies.

The function of the shunt capacitors 22 and 96 is to reduce the sensitivity of the control system at very high frequencies, so that the control shall be essentially in accordance with frequencies where the ear is most sensitive. The function of the series capacitors 97 and 94 is to reduce the response at very low frequencies below the cut-off frequency, where the ear is relatively insensitive, and most of the signals may consist of a rumble, hum, or other components. Essentially the result of the control of the circuit may be to approximate to the sensitivity characteristics of the ear for the type of signal to be reproduced.

The control circuit 6 utilizes an accompanying output filter for filtering the control voltage comprising a series resistor 91 and a parallel capacitor 92, to provide better filtering of the rectified control voltage, thus increasing further the speed of control without introducing spurious "thumps" into the output.

The following typical values of the elements in the circuit of Fig. 6 have been found to be very effective, in practice:

| | |
|---|---|
| Inductor 10 | 2 henries. |
| Capacitor 38 | 140 micromicrofarads, approximately. |
| Inductor 34 | 0.4 henry. |
| Capacitor 35 | 0.01 microfarad. |

| | |
|---|---|
| Capacitor 11 | 60 micromicrofarads, approximately. |
| Vacuum tubes 8 and 93 | 6SJ7. |
| Resistor 37 | 150,000 ohms. |
| Resistors 12, 31, 88, and 91 | 1 megohm. |
| Resistor 13 | 5 megohms. |
| Capacitor 14 | 0.01 microfarad. |
| Capacitor 92 | 0.003 microfarad. |
| Resistor 95 | 250,000 ohms. |
| Capacitor 94 | 300 micromicrofarads. |
| Resistors 21, 95, 99, and 104 | 500,000 ohms. |
| Capacitors 97 and 102 | 500 micromicrofarads. |
| Capacitors 22 and 96 | 200 micromicrofarads. |
| Rectifier 9 | 6H6. |
| Capacitor 29 | 0.002 microfarad. |
| Source impedance $Z_1$ | 35,000 ohms, approximately. |
| Load impedance $Z_2$ | 0.5 megohm, approximately. |

Other variations of constant-k, m-derived, lattice-type, and other filters, and various other networks, such as parallel-T, bridge-T, etc., which provide characteristics similar to filters, may also be used, provided that they control the frequency response in the manner described. Practically any combination of high-pass and low-pass filters may be used together. The low-pass filters of the systems of Figs. 1 to 4, for example, may be substituted in the system of Fig. 6. As with most filters, moreover, those shown may be operated in either direction, that is, with the input terminals 15 and 16 and the output terminals 17 and 18 interchangeable. In either case, the terminating impedance $Z_1$ of the filter will be on the mid-series side, and the terminating impedance $Z_2$ on the mid-shunt side, of the filter. The various filter half-sections may be connected together to form T or $\pi$ sections.

The filter of the present invention is characterized by ease and rapidity of control, with high attenuation beyond cut-off, the points of maximum attenuation approaching infinity. It also may possess resonant types of cut-off characteristics, thus allowing the restoration of aural or other balance. With the automatic control circuit of Fig. 6 the filters are unusually well adapted for noise suppression.

In accordance with the usual conventions in the showing of vacuum-tube circuits, the well known operating-voltage sources, like batteries, power supplies, voltage dividers, bias resistors, transformers, and the like, are not illustrated. It will also be understood that, in any practical system, it may be desirable to add amplification or attenuation, so that the best operating conditions may be obtained. Also vacuum tubes with additional electrodes may be employed, and the feed-back, control bias, and signal may be applied to different electrodes.

Further modifications will also occur to persons skilled in the art, and all such are considered to fall within the spirit and scope of the present invention, as defined in the appended claims.

What is claimed is:

1. An electric filter having a predetermined cut-off frequency and having a series anti-resonant element and a shunt circuit comprising a reactance tube, and means for controlling the reactance tube to vary the predetermined cut-off frequency of the filter.

2. An electric filter having a predetermined cut-off frequency and having a series anti-resonant element and a shunt circuit comprising an inductance and a reactance tube, and means for controlling the reactance tube to vary the predetermined cut-off frequency of the filter.

3. An electric filter having two arms one of which comprises a resonant circuit, the filter having a reactance tube provided with an anode, a cathode and a control electrode and phase-shifting means coupling said anode and said control electrode, and means for applying a variable voltage to the control electrode to vary the filter.

4. An electric filter having two input terminals, two output terminals, a series arm having a resonant circuit connected between one of the input terminals and one of the output terminals, a reactance tube having two principal electrodes, namely, an anode and a cathode, and a control electrode, means coupling one of the principal electrodes to the resonant circuit and the other principal electrode to the other input terminal and the other output terminal to provide a shunt arm for the filter, and means for applying a variable voltage to the control electrode to vary the filter.

5. An electric filter having two input terminals, two output terminals, a series arm having a resonant circuit connected between one of the input terminals and one of the output terminals, a condenser connected to the resonant circuit, a reactance tube having two principal electrodes, namely, an anode and a cathode, and a control electrode, means coupling one of the principal electrodes to the condenser and the other principal electrode to the other input terminal and the other output terminal to provide a shunt arm for the filter, and means applying a variable voltage to the control electrode to vary the filter.

6. An electric filter having two input terminals, two output terminals, a series arm having a resonant circuit connected between one of the input terminals and one of the output terminals, a reactance tube having an anode and a cathode, and one or more control electrodes, means coupling the anode to the resonant circuit and the cathode to the other input terminal and the other output terminal to provide a shunt arm for the filter, and means for applying a variable voltage to a control electrode to vary the filter.

7. An electric filter having two input terminals, two output terminals, a series arm having a resonant circuit connected between one of the input terminals and one of the output terminals, a condenser connected to the resonant circuit, a reactance tube having an anode and a cathode and one or more control electrodes; means coupling the anode to the condenser and the cathode to the other input terminal and the other output terminal to provide a shunt arm for the filter, and means for applying a variable voltage to one of the control electrodes to vary the filter.

8. An electric system having two input terminals, two output terminals, a series arm having an impedance connected between one of the output terminals and one of the input terminals, an inductance connected to the series arm, a reactance tube having two principal electrodes, namely, an anode and a cathode, and a control electrode, means coupling one of the principal electrodes to the inductance and the other principal electrode to the other input and output terminals to provide a shunt arm for the filter, and means for applying a variable voltage to the control electrode to vary the filter.

9. An electric system having two input terminals, two output terminals, a series arm having a reactance connected between one of the output terminals and one of the input terminals, an inductance connected to the series arm, a reactance tube having two principal electrodes, namely, an anode and a cathode, and a control electrode, means coupling one of the principal electrodes to the inductance and the other principal electrode to the other input and output terminals to provide a shunt arm for the filter, and means for applying a variable voltage to the control electrode to vary the filter.

10. An electric system having two input terminals, two output terminals, a series arm having a parallel-connected first inductance and capacitance connected between one of the output terminals and one of the input terminals, a second inductance connected to the parallel-connected inductance and capacitance, a reactance tube having two principal electrodes, namely, an anode and a cathode, and a control electrode, means coupling one of the principal electrodes to the second inductance and the other principal electrode to the other input and output terminals to provide a shunt arm for the filter, and means for applying a variable voltage to the control electrode to vary the filter.

11. An electric system having two input terminals, two output terminals, a series arm having an impedance connected between one of the output terminals and one of the input terminals, an inductance connected to the series arm, a reactance tube having an anode and a cathode and one or more control electrodes, means coupling the anode to the second inductance and the cathode to the other input and output terminals to provide a shunt arm for the filter, and means for applying a variable voltage to the control electrode to vary the filter.

12. An electric filter having a predetermined cut-off frequency and having a series circuit comprising an impedance and a shunt circuit comprising a series-resonant circuit comprising a reactance tube, and means for controlling the reactance tube to vary the predetermined cut-off of the filter.

13. An electric filter for filtering an applied signal having a series arm and a shunt arm, one of the arms comprising a resonant circuit, the other arm comprising a reactance, one of said arms comprising a reactance tube provided with an anode, a cathode and a control electrode and having phase-shifting transmission means between said anode and said control electrode, and means for applying a variable voltage to the control electrode to vary the filter.

14. An electric filter having a predetermined cut-off frequency and having a series anti-resonant element and a shunt circuit comprising a reactance tube, means for applying a signal to the filter to produce a response in the filter, and means for controlling the reactance tube in accordance with a function of the applied signal to modify the response in order to vary the predetermined cut-off frequency in accordance with the applied signal.

15. An electric filter having a predetermined cut-off frequency and having two input terminals, two output terminals, a series arm having a resonant circuit connected between one of the input terminals and one of the output terminals, a reactance tube having two principal electrodes and one or more control electrodes, means coupling one of the principal electrodes to the resonant circuit and the other principal electrode to the other input terminal and the other output terminal to provide a shunt arm for the filter, means for applying a signal to the input terminals to produce a response in the filter, and means for applying to one of the control electrodes a voltage varying in accordance with a function of the applied signal to modify the response in order to vary the predetermined cut-off frequency in accordance with the applied signal.

16. An electric filter having two arms one of which comprises a resonant circuit and one of which comprises a reactance tube provided with two principal electrodes and one or more control electrodes and having a phase shifting path between one of said principal electrodes and one of said control electrodes.

17. An electric filter for filtering an applied unmodulated signal, covering a range of frequencies, said filter having a series arm and a shunt arm, one of said arms comprising a reactance, the other of said arms comprising a reactance tube having a control electrode and controllable in response to a variable control bias applied to said control electrode, said reactance tube simulating a reactance of a sign opposite to the reactance of said first-mentioned reactance, means for applying an unmodulated signal to the filter for transmission by said filter, a rectifier, means for applying said unmodulated signal to said rectifier to obtain a variable control bias varying in accordance with said unmodulated signal, means for applying said varying control bias resulting from said rectification to said control electrode thereby controlling said filter in accordance with said unmodulated signal in such a manner that the range of frequencies transmitted increases with an increase in the level of said unmodulated signal and decreases with a decrease in the lever of said unmodulated signal.

18. An electric filter for filtering an applied unmodulated signal covering a range of frequencies, said filter having a series arm and a shunt arm, one of said arms comprising an impedance, the other of said arms comprising a reactance tube having an anode, a cathode and at least one control electrode, a condenser coupling the anode of said reactance tube directly to said impedance, a capacitance smaller in value than said first-named condenser and coupling the anode of said reactance tube directly to a control electrode in said reactance tube, thereby providing feedback so that the anode circuit of said reactance tube simulates a variable capacitance controllable in accordance with a varying control bias applied to a control electrode, means for applying an unmodulated signal to the filter for transmission by said filter, a rectifier, means for applying said unmodulated signal to said rectifier to obtain a variable control bias varying in accordance with said unmodulated signal, means for applying said varying control bias resulting from said rectification to said last-named control electrode thereby controlling said reactance tube and consequently said filter in accordance with said unmodulated signal in such a manner that the range of frequencies transmitted increases with an increase in the level of said unmodulated signal and decreases with a decrease in the level of said unmodulated signal.

19. An electric system having, in combination, means for transmitting signals comprising a filter having a series anti-resonant element and a shunt reactance tube, and means controlled in accordance with the signals for controlling the reactance tube to vary the cut-off of the filter.

20. An electric system having, in combination, means for transmitting signals comprising a filter having a series anti-resonant element and a shunt circuit comprising an inductance and a reactance tube, and means controlled in accordance with the signals for controlling the reactance tube to vary the cut-off of the filter.

21. An electric system for transmitting unmodulated signals comprising relatively-high-frequency components and relatively-low-frequency components said system comprising a filter having a series arm and shunt arm both arms comprising inductance and said shunt arm comprising also a capacitive reactance tube in series with said inductance and comprising a control electrode, said system comprising also means for applying said unmodulated signals to said filter for transmission by said filter, means comprising a rectifier, deriving a control voltage from said unmodulated signals, means applying said control voltage to said control electrode thereby to control said filter in accordance with said signals to reduce the transmission of said relatively-high-frequency components at low signal levels.

HERMON H. SCOTT.

REFERENCES CITED

The following references are of record in the file of this patent:

UNITED STATES PATENTS

| Number | Name | Date |
|---|---|---|
| 1,947,822 | Barden | Feb. 20, 1934 |
| 1,950,759 | Terman | Mar. 13, 1934 |
| 2,002,216 | Bode | May 21, 1935 |
| 2,017,270 | Yolles | Oct. 15, 1935 |
| 2,053,841 | Prescott | Sept. 8, 1936 |
| 2,072,708 | Case | Mar. 2, 1937 |
| 2,148,030 | McLennan | Feb. 21, 1939 |
| 2,263,683 | Rockwell | Nov. 25, 1941 |
| 2,369,952 | Devine | Feb. 20, 1945 |